United States Patent  
Nakayama et al.

(10) Patent No.: US 10,514,244 B2
(45) Date of Patent: Dec. 24, 2019

(54) ROUNDNESS MEASURING MACHINE

(71) Applicant: MITUTOYO CORPORATION, Kanagawa (JP)

(72) Inventors: Tatsuki Nakayama, Hiroshima (JP); Yoshiyuki Omori, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 190 days.

(21) Appl. No.: 15/689,370

(22) Filed: Aug. 29, 2017

(65) Prior Publication Data
US 2018/0073852 A1 Mar. 15, 2018

(30) Foreign Application Priority Data

Sep. 13, 2016 (JP) .................................. 2016-178459

(51) Int. Cl.
*G01B 5/20* (2006.01)
*G01B 7/28* (2006.01)
*G01B 21/20* (2006.01)

(52) U.S. Cl.
CPC .............. *G01B 5/201* (2013.01); *G01B 7/282* (2013.01); *G01B 21/20* (2013.01)

(58) Field of Classification Search
CPC ......... G01B 5/201; G01B 7/282; G01B 21/20
USPC .......................................................... 33/550
See application file for complete search history.

(56) References Cited

U.S. PATENT DOCUMENTS

| 5,694,339 | A  | * | 12/1997 | Ishitoya ............... | G05B 19/401 |
| | | | | | 33/503 |
| 7,392,692 | B2 | * | 7/2008 | Noda ..................... | G01B 5/008 |
| | | | | | 33/503 |
| 9,347,761 | B2 | * | 5/2016 | Montgomery ......... | G01B 5/201 |
| 9,803,968 | B2 | * | 10/2017 | Nakayama ............. | G01B 5/201 |
| 2001/0008994 | A1 | * | 7/2001 | Omori ................... | B23Q 17/20 |
| | | | | | 702/95 |
| 2008/0295349 | A1 | * | 12/2008 | Uhl ....................... | G01B 5/008 |
| | | | | | 33/503 |
| 2013/0139397 | A1 | * | 6/2013 | Jordil ................... | G01B 21/047 |
| | | | | | 33/503 |
| 2013/0255091 | A1 | * | 10/2013 | Fukuta ................... | G01B 5/008 |
| | | | | | 33/503 |
| 2015/0300798 | A1 | * | 10/2015 | Pettersson ............. | G01B 21/04 |
| | | | | | 33/503 |

(Continued)

FOREIGN PATENT DOCUMENTS

JP 2016-065751 A 4/2016

*Primary Examiner* — Yaritza Guadalupe-McCall
(74) *Attorney, Agent, or Firm* — Greenblum & Bernstein, P.L.C.

(57) ABSTRACT

A roundness measuring machine includes: a base; a table rotatable relative to the base; a probe configured to scan a surface of a workpiece mounted on the table; a motor configured to rotate the table; and a control device configured to control a rotation of the motor. The control device includes: a starting current detector configured to detect a starting current of the motor; and an acceleration/deceleration time setting unit configured to detect at least one of acceleration time and deceleration time for the motor in accordance with the starting current. The roundness measuring machine can suitably set the acceleration time and the deceleration time for the motor corresponding to the inertia moment of the workpiece mounted on the table.

2 Claims, 9 Drawing Sheets

(56) References Cited

U.S. PATENT DOCUMENTS

| 2016/0084631 A1* | 3/2016 | Nakayama | G01B 5/201 33/550 |
|---|---|---|---|
| 2018/0058836 A1* | 3/2018 | Nakayama | G01B 5/201 |
| 2018/0073852 A1* | 3/2018 | Nakayama | G01B 5/201 |
| 2018/0267505 A1* | 9/2018 | Shinoda | G05B 19/4086 |

* cited by examiner

FIG.5

| Im | Ts | Tb |
|---|---|---|
| $Im \geq ImH$ | TsH | TbH |
| $ImH > Im \geq Im(n-1)$ | Ts(n) | Tb(n) |
| $Im(n-1) > Im \geq Im(n-2)$ | Ts(n-1) | Tb(n-1) |
| ⋮ | ⋮ | ⋮ |
| $Im(1) > Im \geq ImL$ | Ts(1) | Tb(1) |
| $ImL > Im$ | TsL | TbL |

ROUNDNESS MEASURING MACHINE

The entire disclosure of Japanese Patent Application No. 2016-178459 filed Sep. 13, 2016 is expressly incorporated by reference herein.

TECHNICAL FIELD

The present invention relates to a roundness measuring machine configured to measure a contour of a workpiece.

BACKGROUND ART

Roundness measuring machines are used to measure a contour of a workpiece.

To measure a contour of a workpiece by a roundness measuring machine, the workpiece is mounted on a rotary table and a probe is brought into contact with a circumferential surface of the workpiece rotated along with the table (see Patent Literature 1: JP 2016-065751 A).

To perform an accurate measurement, the roundness measuring machine may perform an operation control so that the rotation speed of the workpiece and the table falls within a predetermined range, when the probe is brought into contact with the circumferential surface of the workpiece to perform measurement.

In measuring the circumferential surface of the workpiece by the above roundness measuring machine, the workpiece needs to be rotated at a predetermined speed suitable for measurement. A driving force is thus applied to the table to accelerate the workpiece from a resting state to a desired rotation speed.

Incidentally, each workpiece has its own inertia moment. Thus, even when the same driving force is applied to the table, a time (acceleration time) elapsed before the rotation speed of each workpiece reaches the desired range is different. In other words, a workpiece having a large inertia moment requires a long acceleration time, while a workpiece having a small inertia moment requires a short acceleration time.

Such an acceleration time should preferably be shortened as much as possible in terms of operating efficiency because, if so, a measurement operation can be started soon. However, when the acceleration time is extremely short, the workpiece is unlikely to be appropriately measured at the desired rotation speed due to an insufficient acceleration of the workpiece.

It should be noted that a workpiece having a large inertia moment can be sufficiently accelerated in a short time by increasing the driving force for the table. However, a powerful driving mechanism is unsuitable for enhancing the accuracy because such a mechanism should be unnecessary excess equipment for a measurement state with a constant rotation speed and may mechanistically impose an excessive load on the measuring device as a whole. Accordingly, the driving mechanism for the table has not been powered up more than necessary.

Further, although an acceleration time shortened as much as possible is also favorable for an arrangement for controlling the acceleration of the table, an acceleration time suitable for the inertia moment of the workpiece mounted on the table is not automatically determinable. If the determined acceleration time is shorter than an acceleration time suitable for the inertia moment of the workpiece, the table, which is affected by a large inertia moment, is controlled to be rapidly accelerated, causing a problem to the operation of a motor that drives the table.

To deal with the above problems related to the acceleration time, a typical roundness measuring machine uses a sufficiently long acceleration time determined in accordance with the inertia moment of the largest workpiece (i.e., one of measurable workpieces with the largest weight and diameter).

Specifically, the acceleration time in such a typical roundness measuring machine is set long to ensure that the acceleration time becomes sufficient for even a workpiece having a large inertia moment to reach a desired rotation speed necessary for measurement without causing a problem to the operation of the motor. In other words, it has been considered that performing a reliable measurement has priority over operating efficiency.

Further, similar problems may be caused in relation to a time (deceleration time) elapsed before the workpiece is decelerated to the resting state after a brake is applied to the table with the workpiece being rotated.

In other words, when a brake is applied to a workpiece having a large inertia moment in a short time, a load on a mechanistical portion is disadvantageously increased. Additionally, an angular position of the table is inaccurately determined when a brake is applied to a workpiece having a large inertia moment in a short time. Accordingly, the deceleration time has also been set sufficiently long.

An acceleration/deceleration time (acceleration time and deceleration time) of the table of the typical roundness measuring machine has thus been set sufficiently long to allow a workpiece having a large inertia moment not to be forcibly accelerated and decelerated with a high accuracy.

However, such a sufficiently long acceleration/deceleration time is longer than actually required acceleration/deceleration times for almost all the various workpieces. This results in increasing the total time required to measure the workpieces and, consequently, in lowering a processing efficiency of the roundness measuring machine per unit time.

SUMMARY OF THE INVENTION

An object of the invention is to provide a roundness measuring machine that is improved in measuring efficiency while ensuring a measuring accuracy.

According to an aspect of the invention, a roundness measuring machine includes: a base; a table rotatable relative to the base; a probe configured to scan a surface of a target workpiece mounted on the table; a motor configured to rotate the table; and a control device configured to control a rotation of the motor, the control device including: a starting current detector configured to detect a starting current of the motor; and an acceleration/deceleration time setting unit configured to set at least one of acceleration time and deceleration time for the motor in accordance with the starting current of the motor.

In the above aspect of the invention, the starting current detector detects the starting current of the motor.

At the start of the motor, the starting current, which is larger than an electric current for a steady operation, flows through the motor. The starting current is proportional to the load torque of the motor, and the load torque of the motor is proportional to the inertia moment of the workpiece mounted on the table. In other words, the magnitude of the starting current detected by the starting current detector corresponds to the inertia moment of the workpiece mounted on the table.

In the above aspect of the invention, the acceleration/deceleration time setting unit sets at least one of acceleration time and deceleration time for the motor in accordance with the starting current of the motor.

Specifically, the acceleration/deceleration time setting unit sets the acceleration time or the deceleration time long when the starting current detected by the starting current detector is large. In contrast, when the starting current is small, the acceleration time or the deceleration time is set short. The acceleration time and the deceleration time may be set in accordance with the starting current by calculation using a formula or by referring to a data table, and may be continuously proportional to the starting current or set stepwise to correspond to each range of the values of the starting current.

The acceleration time or the deceleration time is thus set longer as the inertia moment of the workpiece is larger. Otherwise, the acceleration time or the deceleration time is set shorter as the inertia moment of the workpiece is smaller.

The roundness measuring machine of the aspect of the invention is thus allowed to suitably set the acceleration time or the deceleration time corresponding to the inertia moment of the workpiece mounted on the table. In other words, the acceleration time or the deceleration time does not need to be limited to a long time corresponding to a workpiece with a large inertia moment. This results in a reduction in time for the motor to be accelerated/decelerated before/after the scanning operation of the probe on the workpiece. Incidentally, since it is not necessary to change time when the motor is rotated at a constant speed, a measurement time allowing for an accurate measurement can be ensured.

Accordingly, the aspect of the invention can provide the roundness measuring machine that is improved in measuring efficiency while ensuring a measuring accuracy.

In the above aspect, the roundness measuring machine may be configured to measure roundnesses of a plurality of workpieces including the target workpiece, and the acceleration/deceleration time setting unit may be configured to set in advance an initial value of the at least one of acceleration time and deceleration time based on an inertia moment of one of the plurality of measurable workpieces having a largest weight or a largest diameter, and to update the at least one of acceleration time and deceleration time to be shorter as the detected starting current is smaller.

The initial value of the acceleration time for the motor, which corresponds to a workpiece with a large inertia moment, is thus set sufficiently long to stabilize the startup of the motor. Likewise, the deceleration time for the motor is set sufficiently long to stabilize the deceleration of the motor.

BRIEF DESCRIPTION OF DRAWING(S)

FIG. 5 is a table showing the example of the acceleration/deceleration time set by the acceleration/deceleration time setting unit according to the exemplary embodiment.

DESCRIPTION OF EMBODIMENT(S)

Roundness Measuring Machine

Figure 1:
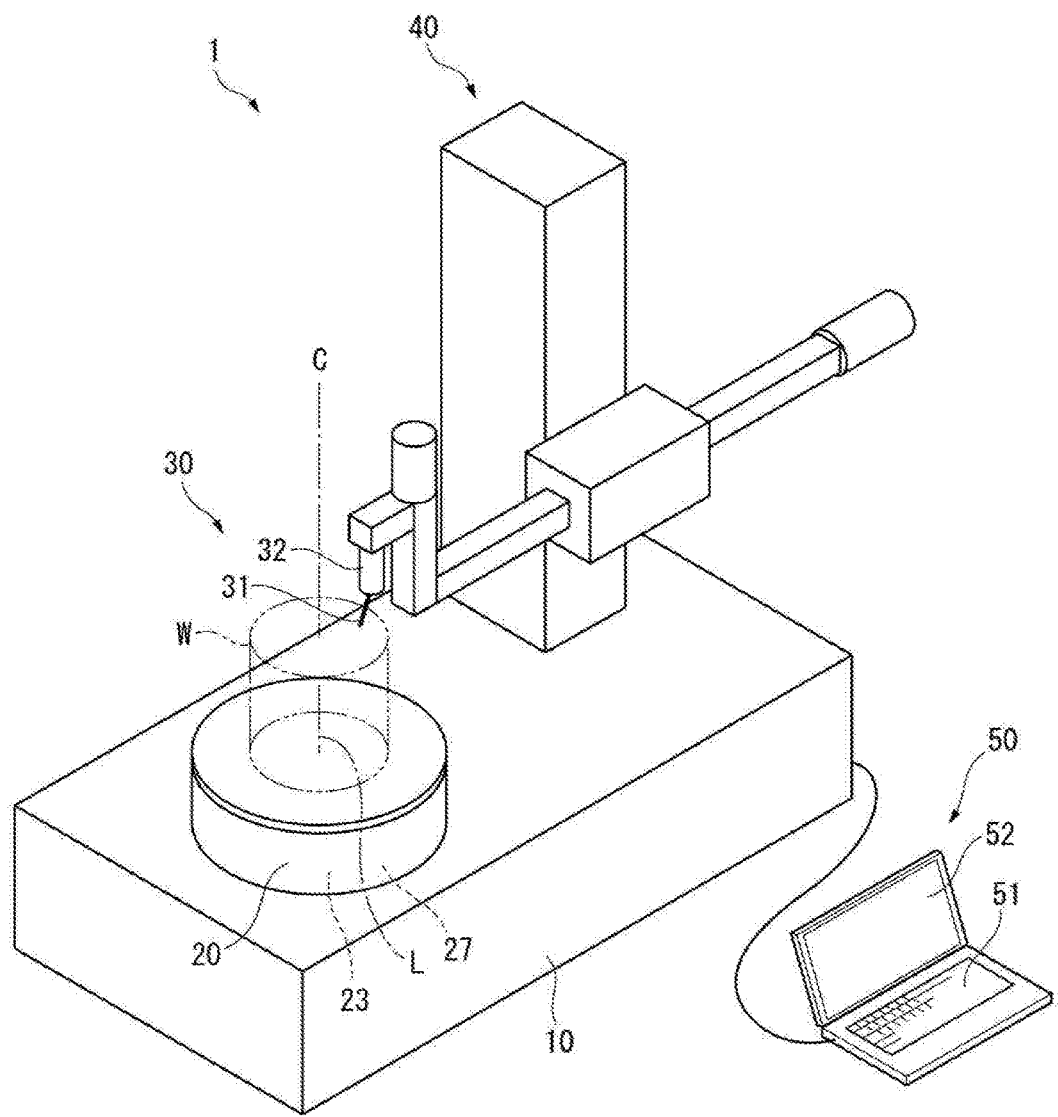
FIG. 1 is a perspective view showing a roundness measuring machine according to an exemplary embodiment of the invention.

As shown in FIG. 1, a roundness measuring machine 1 includes a base 10, a table 20 rotatable relative to the base 10, a probe 30 that scans a surface of a workpiece W mounted on the table 20, a probe moving mechanism 40 that moves the probe 30, and a control device 50 that controls an operation of the probe moving mechanism 40 and performs a process on a scanning output from the probe 30.

The base 10 is installed with a motor 23 that rotates the table 20. The control device 50 controls an operation of the motor 23.

The table 20 is rotatable relative to the base 10 around a rotation axis L defined in a vertical direction. A workpiece W is to be mounted on an upper surface of the table 20. A center axis C of the workpiece W is aligned with the rotation axis L of the table 20.

The motor 23 rotates the table 20 via a decelerator or the like. The table 20 is rotated at a constant speed during the rotation of the motor 23 at a predetermined rotation speed N1. The table 20 is provided with an angle sensor 27 that reads a rotation angle of the table 20.

The probe 30 includes a stylus 31 that is to be brought into contact with the workpiece W, and a body 32 that outputs a displacement of the stylus 31 in the form of a signal.

The probe moving mechanism 40 moves the probe 30 in a top-bottom direction and directions toward and away from the workpiece W. The stylus 31 can thus be brought into contact with a circumferential surface of the workpiece W mounted on the table 20 at a desired level.

The control device 50, which may be a personal computer, performs an operation control on components including ones related to roundness measurement of the workpiece W. The control device 50 includes an input terminal 51 and a display 52, through which an operator P can operate the roundness measuring machine 1 and read information.

It should be noted that the control device 50 is independent of a machine body. i.e., the base 10, according to the exemplary embodiment, but the control device 50 may be incorporated in the machine body.

Figure 2:
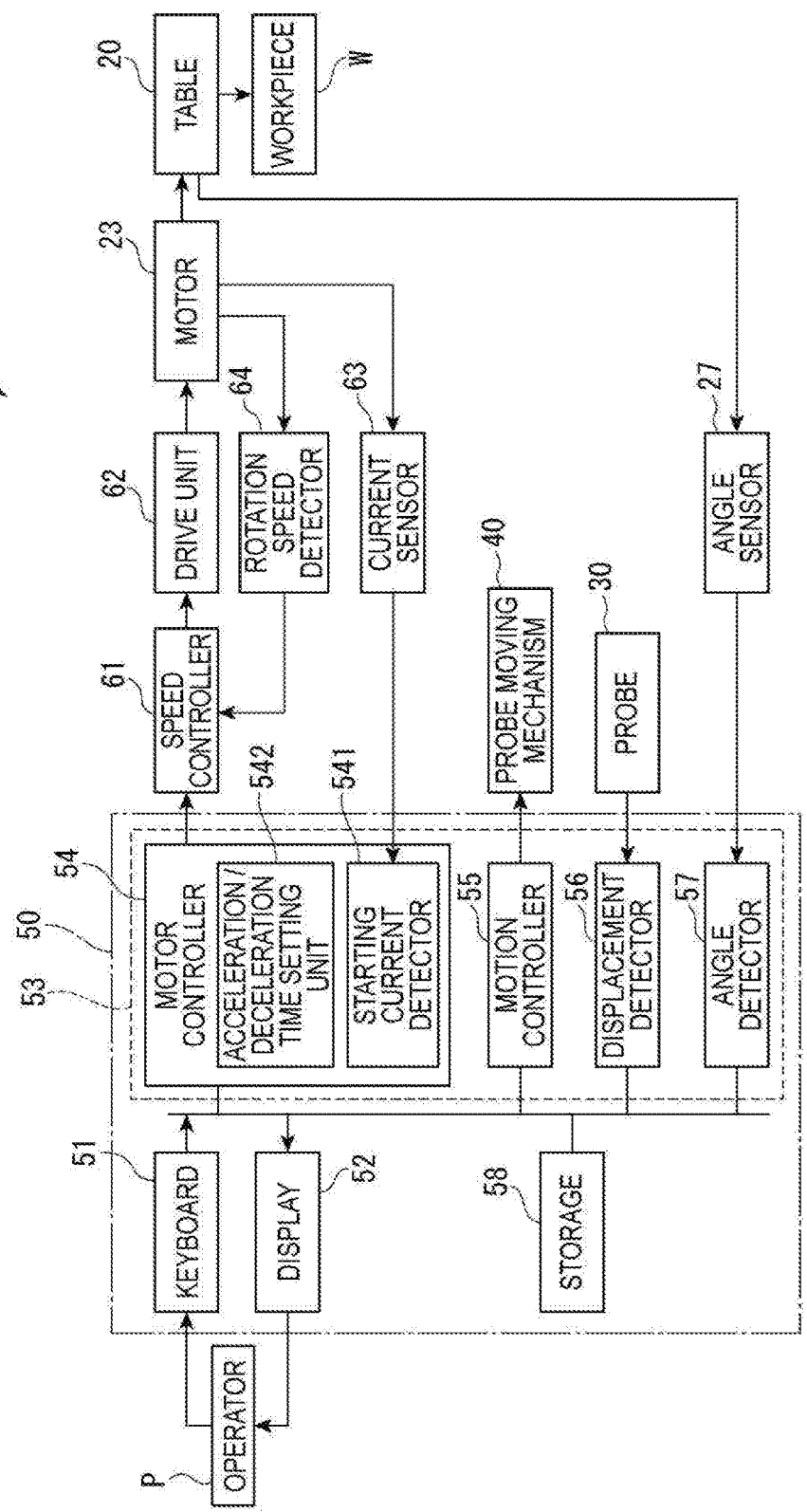
FIG. 2 is a block diagram of the roundness measuring machine according to the exemplary embodiment.
Figure 3:
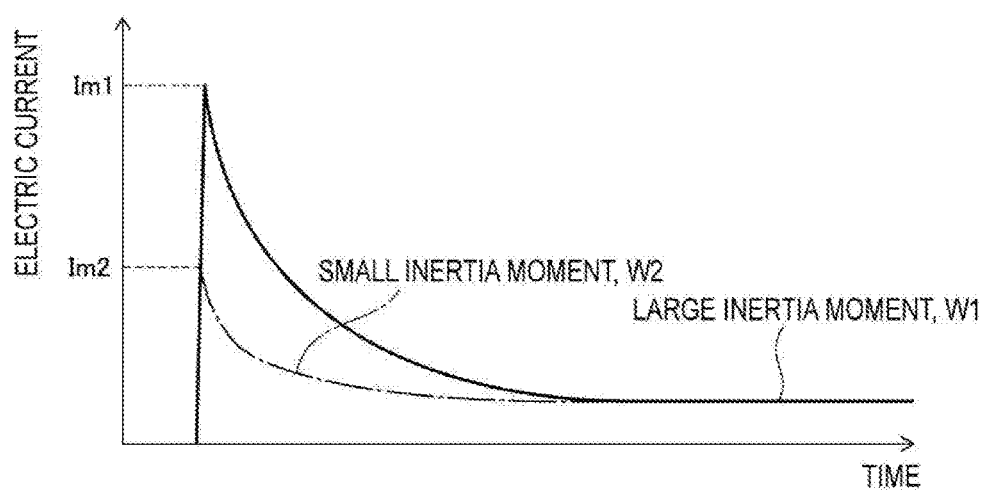
FIG. 3 is a schematic graph showing a starting current for a motor according to the exemplary embodiment.

As shown in FIG. 2, the control device 50, which includes a CPU (Central Processing Unit) and a memory, performs a program stored therein to function as a measurement controller 53.

Specifically, the measurement controller 53 includes a motor controller 54, a motion controller 55, a displacement detector 56 and an angle detector 57. The memory, examples of which include ROM (Read Only Memory) and RAM (Random Access Memory), functions as a storage 58.

The measurement controller 53 controls each component of the roundness measuring machine 1 to perform a predetermined measurement operation on a contour or roundness.

Specifically, the motor controller 54 controls the rotation of the motor 23 to rotate the table 20 at the predetermined rotation speed N1, and the motion controller 55 controls the probe moving mechanism 40 to bring the probe 30 into contact with the circumferential surface of the workpiece W. Subsequently, the angle detector 57 detects the angle of the table 20 based on a signal from the angle sensor 27 during the rotation of the table 20 at the predetermined rotation speed N1, and the displacement detector 56 detects the displacement of the stylus 31 based on a signal from the probe 30. Consequently, displacements around the entire circumference of the workpiece W (i.e., displacements at an angle θ=0 to 360 degrees) are measured, and the contour or roundness of the circumferential surface of the workpiece W is obtained by data processing on the measured displacements.

To allow the motor controller 54 to control the rotation of the motor 23, a speed controller 61, a drive unit 62, a current sensor 63 and a rotation speed detector 64 are located between the motor controller 54 and the motor 23.

The speed controller 61, the drive unit 62, the current sensor 63 and the rotation speed detector 64 may each be an electric circuit and may each be provided to the base 10 or the control device 50.

The speed controller 61 receives various command values inputted from the motor controller 54 and receives a rotation speed of the motor 23 inputted from the rotation speed detector 64. The speed controller 61 generates a control signal for adjusting the rotation speed of the motor 23 to a rotation speed specified by the motor controller 54, and outputs the control signal to the drive unit 62.

The drive unit 62 supplies an electrical power to the motor 23 in response to the control signal inputted from the speed controller 61 to drive the motor 23. The drive unit 62 may be a motor driver including a plurality of switching elements.

The current sensor 63 detects a value of current flowing through the motor 23 and outputs the current value to the motor controller 54.

The rotation speed detector 64 detects the rotation speed of the motor 23 based on, for instance, the signal from the angle sensor 27 and outputs the detected rotation speed to the speed controller 61.

The motor controller 54 includes a starting current detector 541 and an acceleration/deceleration time setting unit 542.

The starting current detector 541 detects a starting current Im of the motor 23 based on the current value of the motor 23 inputted from the current sensor 63.

The acceleration/deceleration time setting unit 542 sets, in accordance with the magnitude of the starting current Im of the motor 23 detected by the starting current detector 541, an acceleration time Ts and a deceleration time Tb for controlling acceleration and deceleration of the motor 23.

Control Operation for Motor 23

Next, description will be made on an operation for controlling the motor 23 with reference to FIGS. 2 to 6.

Before the motor 23 is started, an initial value of each of the acceleration time Ts and the deceleration time Tb is set in the motor controller 54. The initial value of each of the acceleration time Ts and the deceleration time Tb may be an allowable minimum time derived from the largest one of the weights of the measurable workpieces W or the inertia moment of the workpiece W having the largest diameter. The allowable minimum time herein means the shortest time for the motor 23 to be accelerated from a resting state to the predetermined rotation speed N1 or decelerated from the predetermined rotation speed N1 to the resting state under the influence of the inertia moment of the workpiece W without obstructing the operation of the motor 23.

In response to the instructions from the operator P, the motor controller 54 outputs to the speed controller 61 various command values for starting the motor 23 based on the initial value of the acceleration time Ts. The speed controller 61 generates a control signal based on the inputted various command values and outputs the control signal to the drive unit 62. The drive unit 62 starts the motor 23 in response to the inputted control signal.

At the start of the motor 23, the starting current Im, which is larger than an electric current for a steady operation, flows through the motor 23. The starting current Im is proportional to the load torque of the motor 23, and the load torque of the motor 23 is proportional to the inertia moment of the workpiece W mounted on the table 20. In other words, the magnitude of the starting current Im corresponds to the magnitude of the inertia moment of the workpiece W mounted on the table 20 (see FIG. 3).

Immediately after the start of the motor 23, the starting current detector 541 detects the starting current Im, which is the peak current based on current values inputted from the current sensor 63. The acceleration/deceleration time setting unit 542 then sets the acceleration time Ts and the deceleration time Tb (acceleration/deceleration time Ts, Tb) in accordance with the starting current Im detected by the starting current detector 541.

Specifically, the acceleration/deceleration time setting unit 542 sets the acceleration/deceleration time Ts, Tb shorter as the starting current Im is smaller. The acceleration/deceleration time Ts, Tb may be set in accordance with the starting current Im by calculation using a formula or by referring to a data table. Further, the acceleration/deceleration time Ts, Tb may be set to be continuously proportional to the starting current Im. Alternatively, the starting current Im may be divided into a plurality of ranges and the acceleration/deceleration time Ts, Tb may be set stepwise to correspond to each range.

Figure 4:
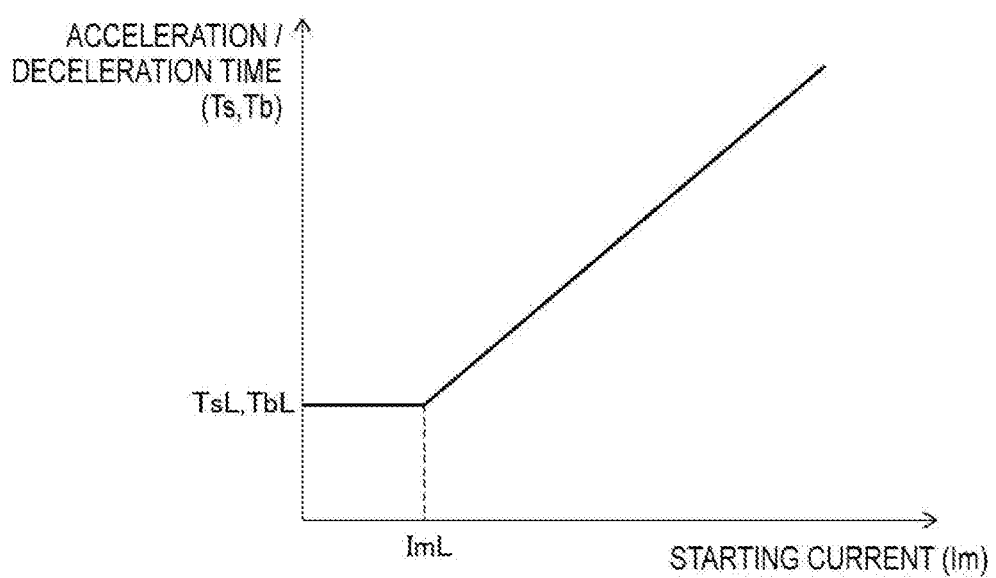
FIG. 4 is a graph showing an example of an acceleration/deceleration time set by an acceleration/deceleration time setting unit according to the exemplary embodiment.

For instance, FIG. 4 shows a relationship between the starting current Im and the acceleration/deceleration time Ts, Tb set using the formula. The acceleration/deceleration time Ts, Tb is continuously proportional to the starting current Im. However, when the starting current Im is equal to or less than a predetermined low current value ImL, a constant necessary minimum times TsL, TbL are set to avoid the breakage of the driving system for the table 20 due to a sudden motion.

Further, FIG. 5 shows the data table showing the acceleration/deceleration time Ts, Tb corresponding to each range of the starting current Im. The acceleration/deceleration time Ts, Tb is set stepwise to correspond to each range of the starting current Im.

Incidentally, in the table shown in FIG. 5, a range of the starting current Im from the predetermined low current value ImL to less than a predetermined high current value ImH is divided into n ranges. The values of the acceleration time Ts for the above ranges are incremented stepwise from Ts(1) to Ts(n) and the values of the deceleration time Tb are incremented stepwise from Tb(1) to Tb(n).

Further, the necessary minimum times TsL, TbL for avoiding the breakage of the driving system for the table 20 due to a sudden motion are assigned to a range less than the predetermined low current value ImL.

Further, in the table shown in FIG. 5, allowable minimum times TsH, TbH, which are derived from the largest one of the weights of the measurable workpieces W or the inertia moment of the workpiece W having the largest diameter, are assigned to a range over the predetermined high current value ImH. The allowable minimum time TsH herein means the shortest time for the motor 23 to be accelerated to the predetermined rotation speed N1 after the start of the motor 23 under the influence of the inertia moment of the workpiece W. The allowable minimum time TbH means the shortest time for the motor 23 to be decelerated from the predetermined rotation speed N1 to the resting state under the influence of the inertia moment of the workpiece W.

The motor controller 54 then calculates an acceleration rate allowing the motor 23 to reach the predetermined rotation speed N1 over a period of the updated acceleration time Ts, and outputs a command value(s) including a rotation speed for achieving the calculated acceleration rate to the speed controller 61.

It should be noted that the deceleration time Tb set by the acceleration/deceleration time setting unit 542 may be temporarily stored in the storage 58.

Upon reception of the command value(s) from the motor controller 54, the speed controller 61 generates a control signal based on a difference between the rotation speed inputted from the rotation speed detector 64 and the instructed rotation speed. The drive unit 62 drives the motor 23 in response to such a control signal.

The motor 23 is thus accelerated from the resting state to the predetermined rotation speed N1 over a period of the acceleration time Ts set by the acceleration/deceleration time setting unit 542.

The motor 23 is then controlled to rotate at the predetermined rotation speed N1 until a preset measurement time Tr elapses.

It should be noted that the measurement time Tr, which is time elapsed after a measurement-enabled moment (i.e., the moment when the motor 23 reaches the predetermined rotation speed N1), is set sufficient for the table 20 to rotate by 360 degrees at least once. A surface of the workpiece W mounted on the table 20 is scanned by the probe 30 during the measurement time Tr.

After the elapse of the measurement time Tr, the motor controller 54 calculates, with reference to the deceleration time Tb stored in the storage 58, a deceleration rate allowing the motor 23 to reach the resting state over a period of the deceleration time Tb, and outputs a command value(s) including a rotation speed for achieving the calculated deceleration rate to the speed controller 61.

Upon reception of the command value(s) from the motor controller 54, the speed controller 61 generates a control signal based on a difference between the rotation speed inputted from the rotation speed detector 64 and the instructed rotation speed. The drive unit 62 drives the motor 23 in response to such a control signal.

The motor 23 is thus decelerated from the predetermined rotation speed N1 to the resting state over a period of the deceleration time Tb set by the acceleration/deceleration time setting unit 542.

The above control method allows for controlling the motor 23 to be accelerated from the resting state to the predetermined rotation speed N1 over a period of the set acceleration time Ts and then rotated at the predetermined rotation speed N1 until the elapse of the measurement time Tr. After the elapse of the measurement time Tr, the motor 23 is controlled to be decelerated from the predetermined rotation speed N1 to the resting state over a period of the set deceleration time Tb (see FIG. 6).

Figure 6:
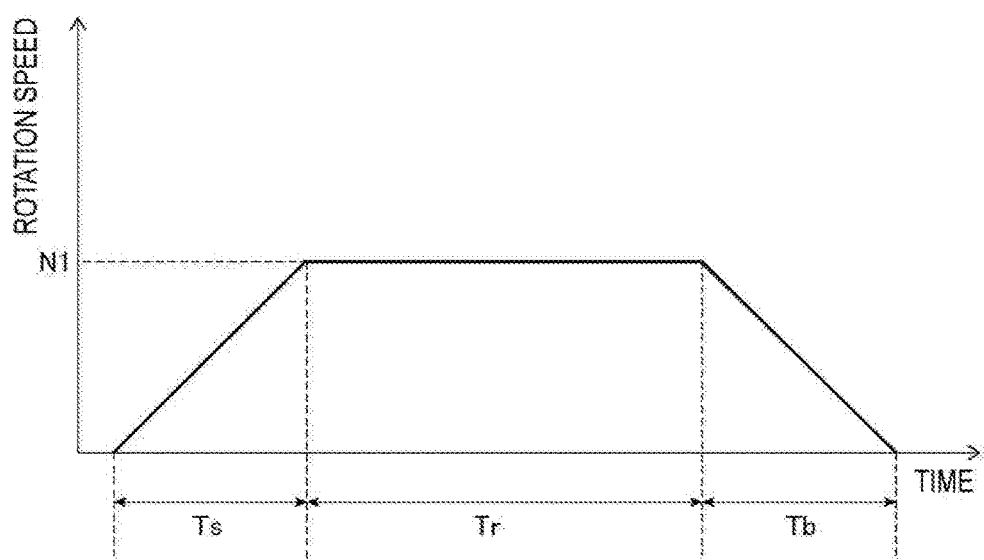
FIG. 6 is a schematic graph showing a relationship between a rotation speed of the motor and time according to the exemplary embodiment.

It should be noted that FIG. 6 does not show the time elapsed from the start of the motor 23 to the update of the acceleration time Ts because this time is extremely short as compared with the acceleration time Ts.

Advantage(s) of Exemplary Embodiment(s)

In the exemplary embodiment, the starting current detector 541 detects the starting current Im of the motor 23, and the acceleration/deceleration time setting unit 542 sets the acceleration/deceleration time Ts, Tb for the motor 23 in accordance with the detected starting current Im. Thus, the acceleration/deceleration time Ts, Tb can be set longer as the inertia moment of the workpiece W is larger and set shorter as the inertia moment of the workpiece W is smaller.

Figure 7:
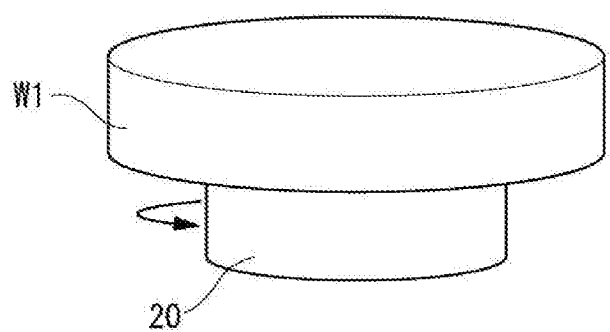
FIG. 7 is a perspective view showing a table and a large workpiece according to the exemplary embodiment.
Figure 8:
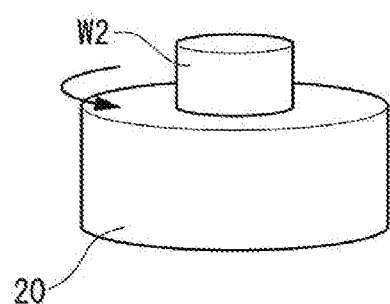
FIG. 8 is a perspective view showing the table and a small workpiece according to the exemplary embodiment.

It is assumed that, for instance, two large workpiece W1 and small workpiece W2, which are respectively shown in FIGS. 7 and 8, are provided. The workpiece W1 is larger in weight and diameter than the workpiece W2 and has a larger inertia moment. A starting current Im2 for measuring the workpiece W2 is thus smaller than a starting current Im1 for measuring the workpiece W1 (see FIG. 3).

Figure 9:
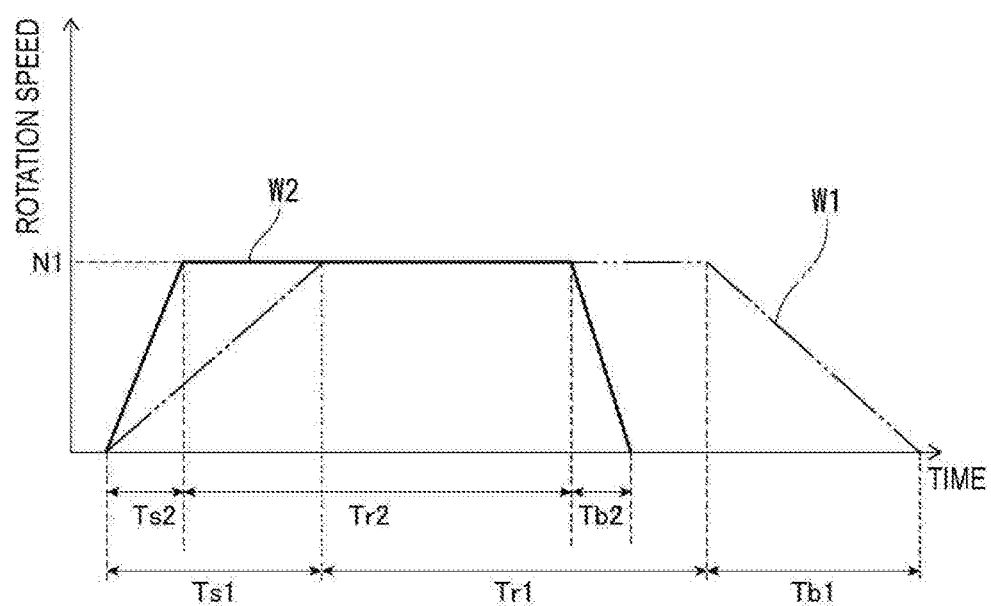
FIG. 9 is a schematic graph showing a relationship between the rotation speed of the motor and time according to the exemplary embodiment.

Accordingly, an acceleration/deceleration time Ts1, Tb1 for the workpiece W1 with a larger inertia moment is set longer, and an acceleration/deceleration time Ts2, Tb2 for the workpiece W2 with a smaller inertia moment is set shorter (see FIG. 9).

In other words, the acceleration/deceleration time Ts, Tb can be suitably set corresponding to the inertia moment of the workpiece W mounted on the table 20 in the exemplary embodiment. The acceleration/deceleration time Ts, Tb does not need to be limited to a long time corresponding to the workpiece W with a large inertia moment. This results in a reduction in time for accelerating/decelerating the motor 23 before/after the scanning operation of the probe 30 on the workpiece W.

It should be noted that the measurement time Tr (e.g., Tr1 and Tr2 in FIG. 9) for the probe 30 to perform an accurate measurement is equally ensured irrespective of the size of the workpiece W.

The roundness measuring machine 1 according to the exemplary embodiment can thus be improved in measuring efficiency while ensuring a measuring accuracy.

Further, in the exemplary embodiment, the acceleration time Ts and the deceleration time Tb, the initial values of which are set in advance in accordance with the inertia moment of the workpiece W having the largest weight or the largest diameter among the measurable workpieces W, are updated to be shorter as the detected starting current Im is smaller. The initial value of the acceleration time Ts for the motor 23, which corresponds to the workpiece W with a large inertia moment, is set sufficiently long to stabilize the startup of the motor 23. Likewise, the deceleration time Tb for the motor 23 is set sufficiently long to stabilize the deceleration of the motor 23.

Modification(s)

The scope of the invention is not limited to the above-described exemplary embodiment(s) but includes modifications and improvements as long as an object of the invention is achievable.

In the exemplary embodiment, the acceleration time Ts, the initial value of which is determined based on the inertia moment of the workpiece having the largest weight or the largest diameter among the measurable workpieces W, is set sufficiently long in advance. The acceleration time Ts is then updated to be shorter as the detected starting current Im is smaller.

However, the invention is not limited to the above arrangement. The acceleration time Ts may have an initial value determined based on, for instance, the inertia moment of the workpiece W most likely to be measured, and the acceleration time Ts may be set longer as the detected starting current Im is larger, whereas the acceleration time Ts may be set shorter as the detected starting current Im is smaller.

Although the acceleration/deceleration time setting unit 542 sets the acceleration time Ts and the deceleration time Tb in accordance with the starting current Im in the exemplary embodiment, either one of the acceleration time Ts and the deceleration time Tb may be set while the other may be a fixed value.

The control device 50 is independent of the base 10 in the exemplary embodiment, but may be incorporated in the base 10. In the latter case, the input terminal 51 and the display 52 may be arranged on a surface of the base 10.

The feed-back control of the motor 23 is performed in the exemplary embodiment, but the invention is not limited thereto. In other words, the roundness measuring machine 1 may include no rotation speed detector 64, and the speed controller 61 may control the drive unit 62 in accordance with only the command value(s) from the motor controller 54.

Further, to allow the roundness measuring machine 1 to determine the rotation angle position of the workpiece W, the deceleration time Tb corresponding to the inertia moment of the workpiece W is preferably ensured. In this case, the above setting method of the deceleration time Tb is usable to set the deceleration time Tb for the positioning.

What is claimed is:

1. A roundness measuring machine comprising:
   a base;
   a table rotatable relative to the base; a probe configured to scan a surface of a target workpiece mounted on the table; a motor configured to rotate the table; and
   a control device configured to control a rotation of the motor, the control device comprising:
   a starting current detector configured to detect a starting current of the motor; and
   an acceleration/deceleration time setting unit configured to set at least one of acceleration time and deceleration time for the motor in accordance with the starting current of the motor.

2. The roundness measuring machine according to claim 1, wherein
   the roundness measuring machine is configured to measure roundnesses of a plurality of workpieces comprising the target workpiece, and
   the acceleration/deceleration time setting unit is configured to set in advance an initial value of the at least one of acceleration time and deceleration time based on an inertia moment of one of the plurality of measurable workpieces having a largest weight or a largest diameter, and to update the at least one of acceleration time and deceleration time to be shorter as the detected starting current is smaller.

* * * * *